United States Patent [19]
Sherman

[11] 3,857,216
[45] Dec. 31, 1974

[54] EASY RELEASE SUSPENSION SYSTEM
[75] Inventor: Morton Sherman, St. Petersburg, Fla.
[73] Assignee: The Celotex Corporation, Tampa, Fla.
[22] Filed: Aug. 7, 1973
[21] Appl. No.: 386,460

[52] U.S. Cl. .................................. 52/489, 52/495
[51] Int. Cl. ............................................ E04b 5/57
[58] Field of Search ............ 52/489, 495, 125, 127; 24/201 A, 201 C, DIG. 22

[56] References Cited
UNITED STATES PATENTS

| | | | |
|---|---|---|---|
| 2,998,112 | 8/1961 | Burgin | 52/489 X |
| 3,263,388 | 8/1966 | Bogert | 52/665 |
| 3,360,896 | 1/1968 | Wright | 52/494 X |
| 3,475,810 | 11/1969 | Mates | 52/127 X |
| 3,660,875 | 5/1972 | Gutman | 24/201 C |

Primary Examiner—Ernest R. Purser
Assistant Examiner—Carl D. Friedman
Attorney, Agent, or Firm—James W. Grace

[57] ABSTRACT

A panel suspension system which comprises a pair of members with interengaging teeth or serrations is easily disassembled by the incorporation of narrow strips of thin, flexible material.

4 Claims, 6 Drawing Figures

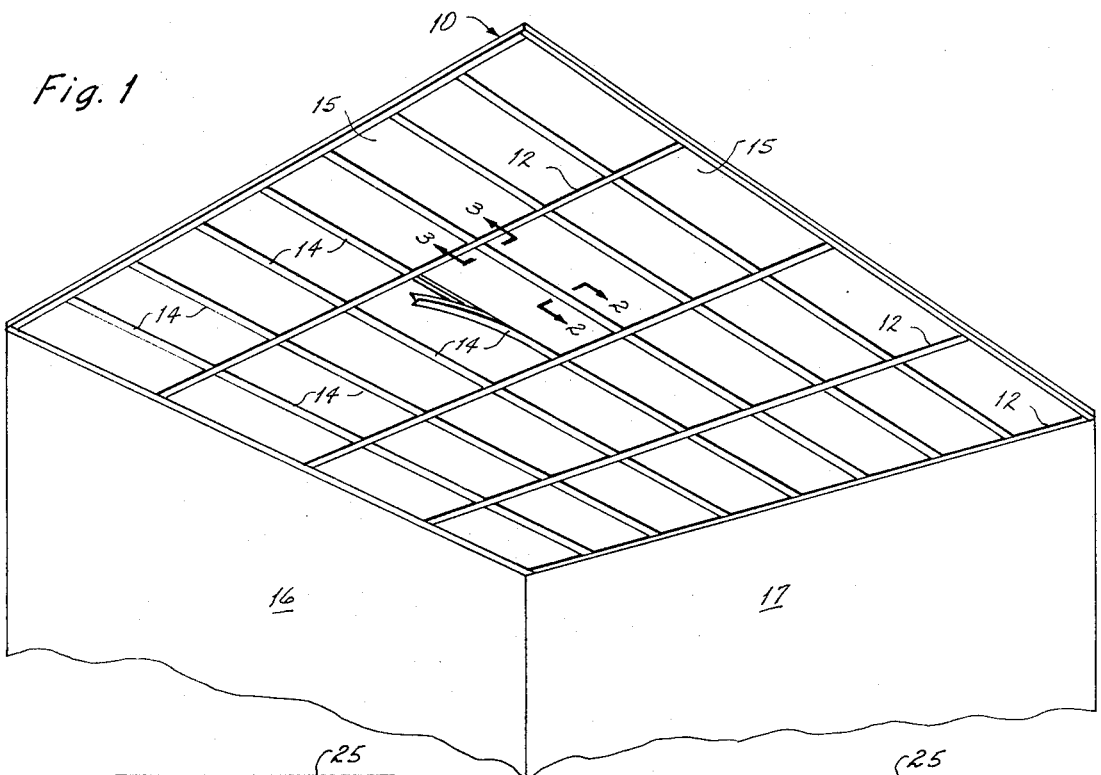
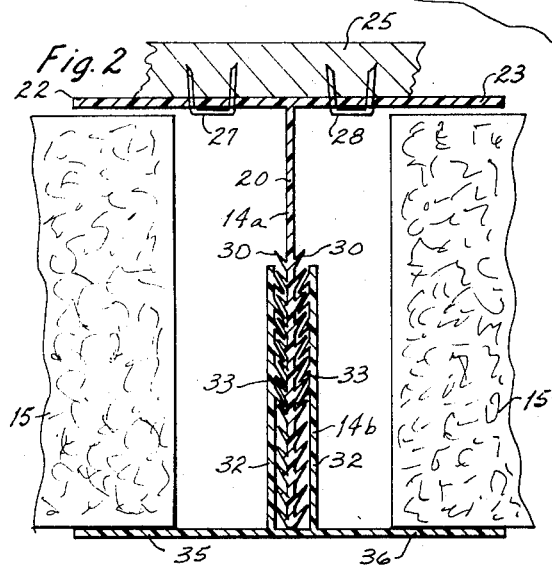
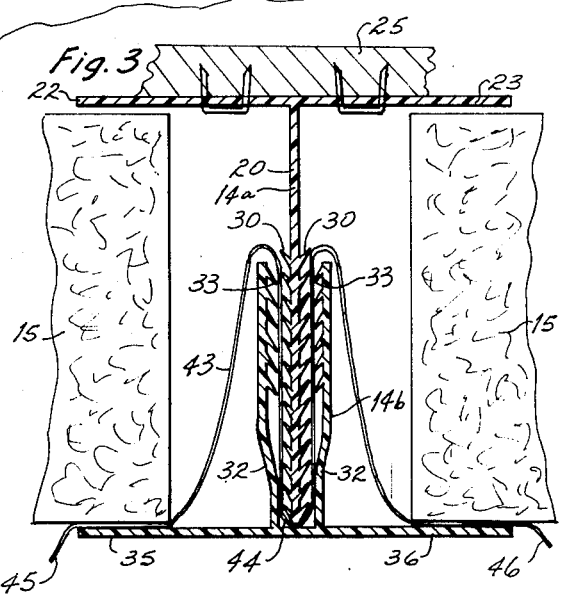
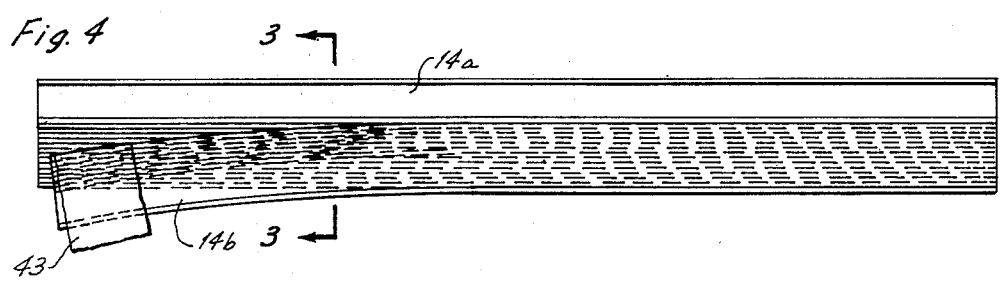

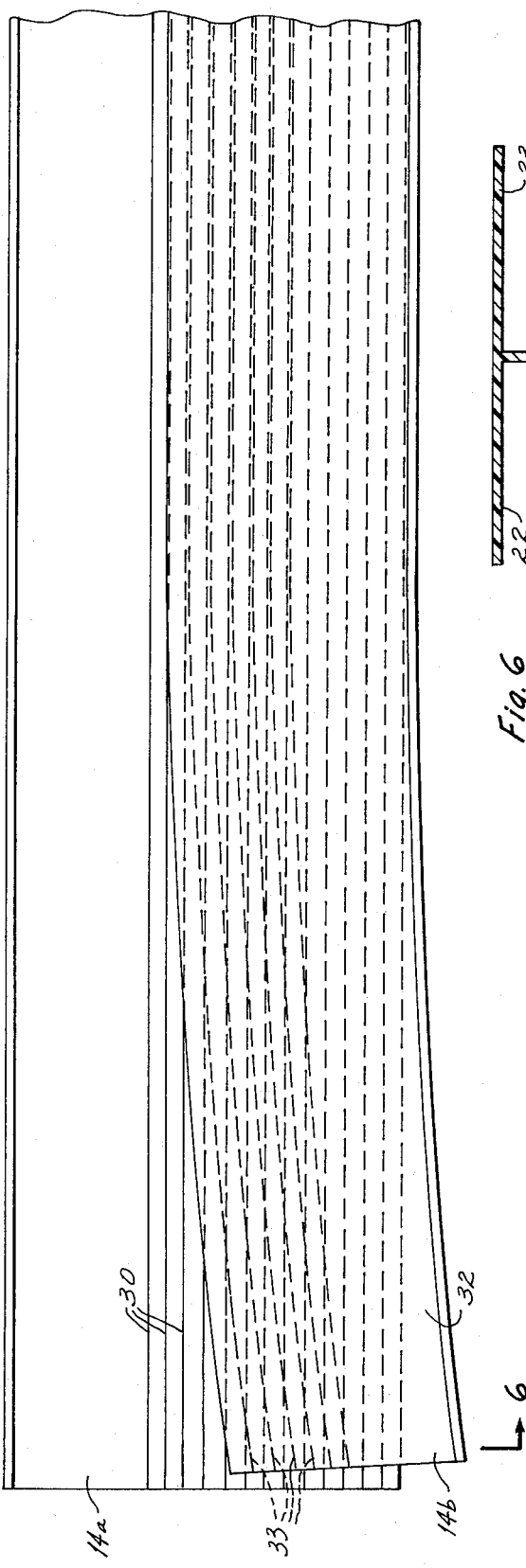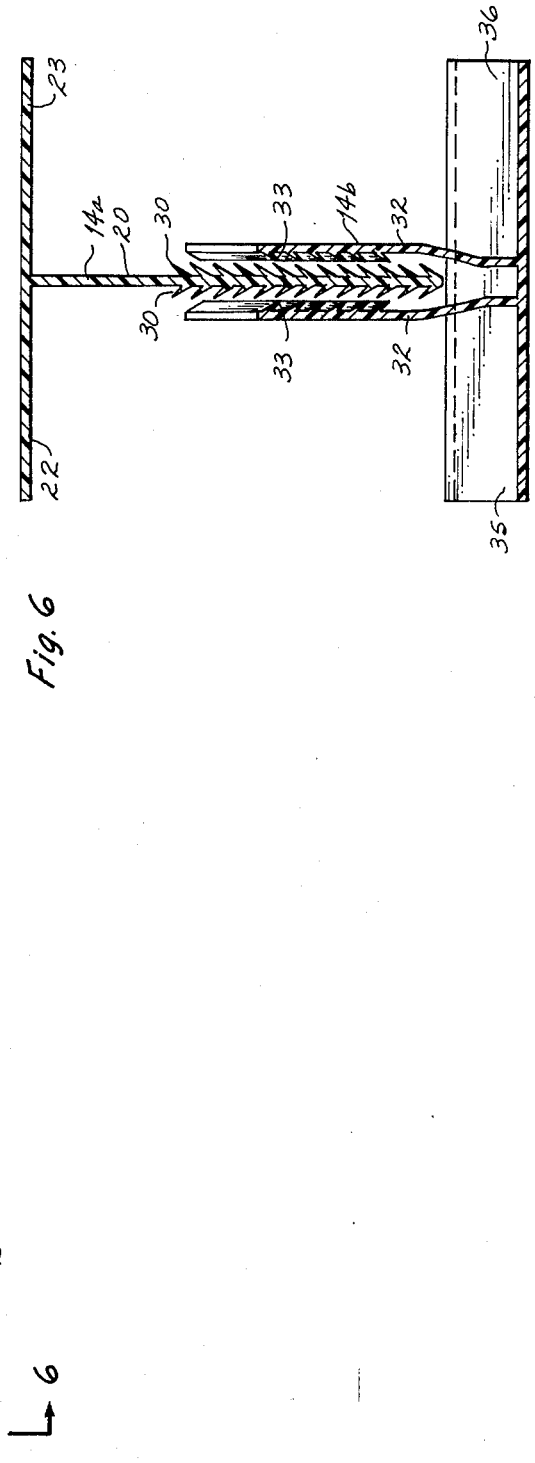

3,857,216

EASY RELEASE SUSPENSION SYSTEM

BACKGROUND OF THE INVENTION

1. Field of the Invention:

The invention pertains to a panel suspension system which is easily assembled and disassembled and finds use particularly as a suspension system for ceiling panels.

2 Description of the Invention:

There are many types of ceiling suspension systems available for supporting panels in a horizontal plane. Among the most easily assembled are those which comprise mating members which have interengaging teeth or serrations. Typical of these systems are those disclosed and claimed in U.S. Pat. Nos. 3,263,388 and 3,360,896 issued to A. Z. Bogert and L. E. Wright respectively. By using a bifurcated element with internal teeth to grasp the teeth on the outer surface of a mating element the two elements are held together. As shown in the patents, one of the elements has a pair of oppositely extending coplanar flanges adapted to support panels. The other element needs only one flange for securing it to an overhead supporting structure, although it may, if desired, have two flanges. arises when it is desired to disassemble them. The usual method of disassembly, as shown in FIG. 9 of Bogert, is the insertion of a tool to spread the bifurcated sides of one of the support elements and remove the other element. However, this requires a tool and, furthermore, as Bogert indicates, at least one adjacent tile must be removed.

Where the titles are held close to the overhead, it may be impractical to remove a tile without destroying it. Wright does not even suggest a means to disassemble his suspension members.

It is therefore an object of the present invention to provide a novel panel suspension system which is easy to assemble and disassemble.

It is another object of the present invention to provide a novel panel suspension system which does not require prior removal of a panel to gain access to the elements for disassembly.

These and other objects and advantages of the present invention will become apparent to those skilled in the art from the following description taken in conjunction with the accompanying drawing in which FIG. 1 is a perspective view of a ceiling assembly made in accordance with the present invention;

FIG. 2 is a cross-sectional view of a portion of the ceiling assembly of the present invention taken along line 2—2 of FIG. 1;

FIG. 3 is a cross-sectional view of a portion of the ceiling assembly of the present invention taken along line 3—3 of FIGS. 1 and 4;

FIG. 4 is a side elevational view of a portion of the ceiling suspension system of the invention:

FIG. 5 is an enlarged view of a portion of the ceiling suspension system shown in FIG. 4, and FIG. 6 is a cross-sectional view of the ceiling suspension system taken along line 6—6 of FIG. 5.

Referring now to the drawing, and particularly FIG. 1, there is shown a ceiling system 10, having main suspension members 12, spaced at predetermined distances in parallel rows. Shorter cross-members 14, span the distance between the main suspension members 12 and from a rectangular grid which supports ceiling panels 15. Walls 16 and 17 form a portion of a room. One of the ends of a cross-member 14 is shown being displaced from its horizontal portion preparatory to its removal from the suspension system.

Referring to FIG. 2, there is shown the assembled cross-member 14 as it appears along a major portion of its length.

Member 14 comprises two elements, a top element 14a and a bottom element 14b. Top element 14a has a downwardly extending web portion 20, integrally connected at its base to a pair of outwardly extending flanges 22 and 23. Flanges 22 and 23 may be fastened to joist 25 by staples 27 and 28 to support top elements 14a. The outer surfaces of web portion 20 have a series of integral, outwardly extending, teeth or serrations 30 in spaced parallel rows. The teeth 30 are disposed at an acute angle with respect to the vertical plane occupied by web portion 20.

Bottom element 14b has an upstanding web portion 32 which is bifurcated and has rows of teeth 33 disposed inwardly and at a downwardly acute angle with respect to the vertical plane of web portion 32. A pair of oppositely, outwardly extending flanges 35 and 36 are integrally attached to the lower edge of web portion 32 to support ceiling panels 15.

Member 14 may be made of extruded plastic material or metal. However, plastic material is preferred because it is relatively inexpensive and simple to extrude or form in the proper shape.

To this point a conventional ceiling suspension system has been described. In assembly, the top elements of main suspension members 12 and cross suspension members 14 are stapled in a prefixed grid pattern with a preset spacing. Ceiling panels are held in place by hand one at a time while the lower elements of main suspension members 12 and cross members 14 are pushed upwardly over the downward depending web portions of the installed top elements.

If desired, the ceiling can be assembled row by row in the more conventional manner well known to those skilled in the art.

According to the present invention, however, at one or both ends of the cross-members 14 or main suspension members 12, there are placed very narrow strips of thin, flexible material which will prevent the otherwise mating teeth of the top and bottom elements of the suspension members from engaging. The fact that a short area of the teeth does not engage will not detract from the overall effectiveness of the holding power of the coupled mating elements.

The flexible strips may be of thin vinyl sheet of 5–20 mils in thickness and only two or three inches in width. These dimensions are not critical but have been found to be most practical. The material can also be paper, oil cloth, wax paper. In fact, it can be any thin material which will fit between and keep apart the teeth of the web portion and the bifurcated portion.

Reference may be had to FIG. 3 which shows the intervening strip 43 in cross-section in place. Strip 43 has a centrally located bight portion 44 against which the lower edge of web portion 20 rests. Along each side of the web portion 20 and between it and the corresponding side of bifurcated element, flexible strip 43 rises. Strip 43 then drapes downwardly until it ends 45 and 46 lie on flanges 35 and 36 and emerge from between the flanges and the panels 15.

In a preferred embodiment, the free ends 45 and 46 of sheet 43 are exposed beyond the outer edge of flanges 35 and 36 and are sufficiently long as to be grasped by one's fingers to disassemble the suspension system. One may simply grasp each exposed end of flexible sheet 43 and pull downwardly. Not only does sheet 43 prevent the teeth of elements 14a and 14b from engaging, but the pulling action just referred to tends to spread the bifurcated sides of upstanding web portion 32 apart to release downwardly extending web portion 20. At the same time because the central bight portion 44 of flexible strip 43 is held in place by the lower edge of web 20, those portions of strip 43 which emerge from, and lie along the top edges of the bifurcated lower element 14b will exert a camming action and positively force the two mating elements apart. In addition, the bight portion 44 actively lifts downwardly depending web 20 upwardly out of the confining area between the sides of bifurcated bottom element 14b.

As the lower web portiton 14b flexes away from the top web portion 20 at one end, the teeth which are adjacent the edge of the strip will become disengaged. As can be seen in FIGS. 4 and 5, the teeth become progressively disengaged starting with those adjacent the strip and continuing with a continuous motion along the length of the suspension member until the two elements are completely disengaged.

FIG. 6 is a cross-sectional view looking down along the coupled, but partially disengaged top and bottom elements 14a and 14b. As the bottom element 14b is moved downwardly out of engagement, the disengaged portion of the teeth adjacent a still engaged portion acts as a cam to disengage the latter teeth progressively. Thus the strip 43 is needed only at the initiation of the disassembly step and the progressively disengaging teeth carry on the disengaging function for the remaining engaged teeth.

While the operation of the release mechanism has been described with respect to a strip 43 having exposed ends 45 and 46, the release can be achieved even if the ends of the strip are not exposed. However, in this latter case, the spreading action and the upward pulling action attributable to the strip will be absent.

If desired, the positions of upper element 14a and lower element 14b can be reversed without seriously, adversely affecting the operation of the system.

In summary, there is shown a novel ceiling panel suspension system which by the incorporation of a release strip can be easily assembled or disassembled.

I claim:

1. A panel suspension system for forming a ceiling by means of a grid of suspension members supporting panels spanning the area between prefixed members comprising at least a first and a second mating element, said first mating element having a depending web portion with parallel, horizontal rows of teeth extending outwardly from both sides thereof, said second mating element having a bifurcated upstanding web with parallel rows of teeth extending inwardly toward each other and adapted to engage said rows of teeth of said first mating element and a strip of flexible material, narrow with respect to the length of the mating elements, positioned between said first and second mating elements and at one end of said mating elements so as to prevent engagement of said rows of teeth of said first and said second elements for a minor portion of their length, whereby said first and said second elements can be easily disengaged to remove said ceiling panels.

2. A panel suspension system as recited in claim 1 in which at least one of said mating elements has oppositely outwardly extending flanges adapted to support said ceiling panels and said flexible strip extends outwardly beyond said flanges to be exposed below said ceiling.

3. A panel suspension system as recited in claim 1 in which said strip of flexible material is vinyl plastic material.

4. A panel suspension system as recited in claim 1 in which the ends of said strip are not exposed below the ceiling.

* * * * *

UNITED STATES PATENT OFFICE
CERTIFICATE OF CORRECTION

Patent No. 3,857,216                  Dated December 31, 1974

Inventor(s) Morton Sherman

It is certified that error appears in the above-identified patent and that said Letters Patent are hereby corrected as shown below:

Col. 1, line 24, after "flanges.", start a new paragraph

--While these systems are used conventionally, a problem--.

Col. 2, line 1, delete "portion" and insert --position--.

Signed and sealed this 22nd day of April 1975.

(SEAL)
Attest:

RUTH C. MASON
Attesting Officer

C. MARSHALL DANN
Commissioner of Patents
and Trademarks